United States Patent [19]

Kudo

[11] Patent Number: 5,103,251
[45] Date of Patent: Apr. 7, 1992

[54] CAMERA CAPABLE OF PROVIDING A PSEUDO PRINT FORMAT

[75] Inventor: Yoshinobu Kudo, Osaka, Japan

[73] Assignee: Minolta Camera Kabushiki Kaisha, Osaka, Japan

[21] Appl. No.: 559,351

[22] Filed: Jul. 30, 1990

[30] Foreign Application Priority Data

Jul. 31, 1989 [JP] Japan .................. 1-199948

[51] Int. Cl.$^5$ .............................................. G03B 1/18
[52] U.S. Cl. .................................. 354/195.1; 354/219
[58] Field of Search ............ 354/199, 200, 201, 195.1, 354/195.12, 195.13, 106, 222, 219, 224, 225

[56] References Cited

U.S. PATENT DOCUMENTS 4,639,111  1/1987  Harvey .................. 354/481
4,816,860  3/1989  Iida et al. ............... 354/402

FOREIGN PATENT DOCUMENTS 1-107240 10/1987 Japan .

Primary Examiner—L. T. Hix
Assistant Examiner—Howard B. Blankenship
Attorney, Agent, or Firm—Burns, Doane, Swecker & Mathis

[57] ABSTRACT

A camera includes a photographic lens, a viewfinder having an objective lens for focusing a subject image on a focal plane, and the eye-piece lens for magnifying the subject image on the focal plane, driving device for driving the objective lens according to focal length of the photographic lens, and generating device for generating pseudo focal length according to position of the eye-piece lens. This camera provides an increased magnification in a small size and with ease, and enlarges a limited pseudo telephoto print area to the entire finder field so that the photographer can confirm the pseudo telephoto print view.

17 Claims, 13 Drawing Sheets

CAMERA CAPABLE OF PROVIDING A PSEUDO PRINT FORMAT

BACKGROUND OF THE INVENTION AND RELATED ART STATEMENT

The present invention relates to a camera capable of providing a pseudo print format, and more particularly to a camera having a viewfinder providing the photographer with not only an actual view which is used for the photographer to confirm the view of the subject which is actually focused by the photographic lens, but also a pseudo view which is used for the photographer to confirm the view within a limited pseudo telephoto print area to be enlarged in the printing process.

There has been known a camera equipped with a viewfinder having both an actual zooming that the field of view is varied by varying the focal length of the photographic lens, and a pseudo zooming that the photographer is provided with a pseudo view which is enlarged for a limited pseudo telephoto print.

For example, U.S. Pat. No. 4,639,111 discloses a camera provided with a viewfinder including an objective lens having a variable focal length. The magnification of the viewfinder is varied by driving the objective lens in accordance with variation of the focal length of the photographic lens, further by driving the objective lens in accordance with variation of the size of a limited pseudo telephoto print area.

In other words, the magnification of the viewfinder has an actual magnification which is varied in accordance with the variation of the focal length of the photographic lens, and a pseudo magnification which is varied in accordance with the variation of the size of a limited pseudo telephoto print area.

More specifically, as the actual magnification of the photographic lens is increased, the magnification of the viewfinder is proportionally increased. Also, as the limited pseudo telephoto print area is decreased, the pseudo magnification of the viewfinder is reverse proportionally increased. Accordingly, the viewfinder is necessary to have such a long focal length as to attain the pseudo magnification greater than the actual magnification. In the above-mentioned U.S. Patent, the magnification of the viewfinder is varied only by varying the focal length of the objective lens of the viewfinder. Accordingly, it will be seen that it is very costly and troublesome to construct the viewfinder which can provide a considerably long focal length only by movement of the objective lens of the viewfinder.

In the above-mentioned U.S. Patent, also, when the photographer wishes to confirm the actual view of the photographic lens after seeing the pseudo view for a limited pseudo telephoto print, the objective lens of the viewfinder is required to move to such a position as to provide the actual view of the photographic lens. Accordingly, it will be seen that as the limited pseudo telephoto print area is smaller, longer time is required to move the objective lens of the viewfinder.

It is an object of the present invention to provide a viewfinder which has overcome the above-mentioned drawbacks.

SUMMARY OF THE INVENTION

According to the present invention, a camera comprises a photographic lens, a viewfinder including an objective lens for focusing a subject image on a focal plane, and the eye-piece lens for magnifying the subject image on the focal plane, driving means for driving the objective lens according to focal length of the photographic lens, and generating means for generating pseudo focal length according to position of the eye-piece lens.

Also, according to the present invention, a camera comprises a photographic lens for focusing an image of a subject on a medium, an optical viewfinder including an objective lens for focusing another image of the subject being focused by the photographic lens on a focal plane, and an eye-piece lens for magnifying the image on the focal plane, changing means for changing focal length of the photographic lens, first controlling means in responsive to the changing means for controlling either of the objective lens and the eye-piece lens, directing means for directing a size of an subject to be photographed to generate a signal of the size, and second controlling means for controlling the other lens of the optical viewfinder according to the signal.

This and other objects, features and advantages of the present invention will become more apparent upon a reading of the following detailed description and drawings.

DETAILED DESCRIPTION OF PREFERRED EMBODIMENTS OF THE INVENTION

Figure 1:
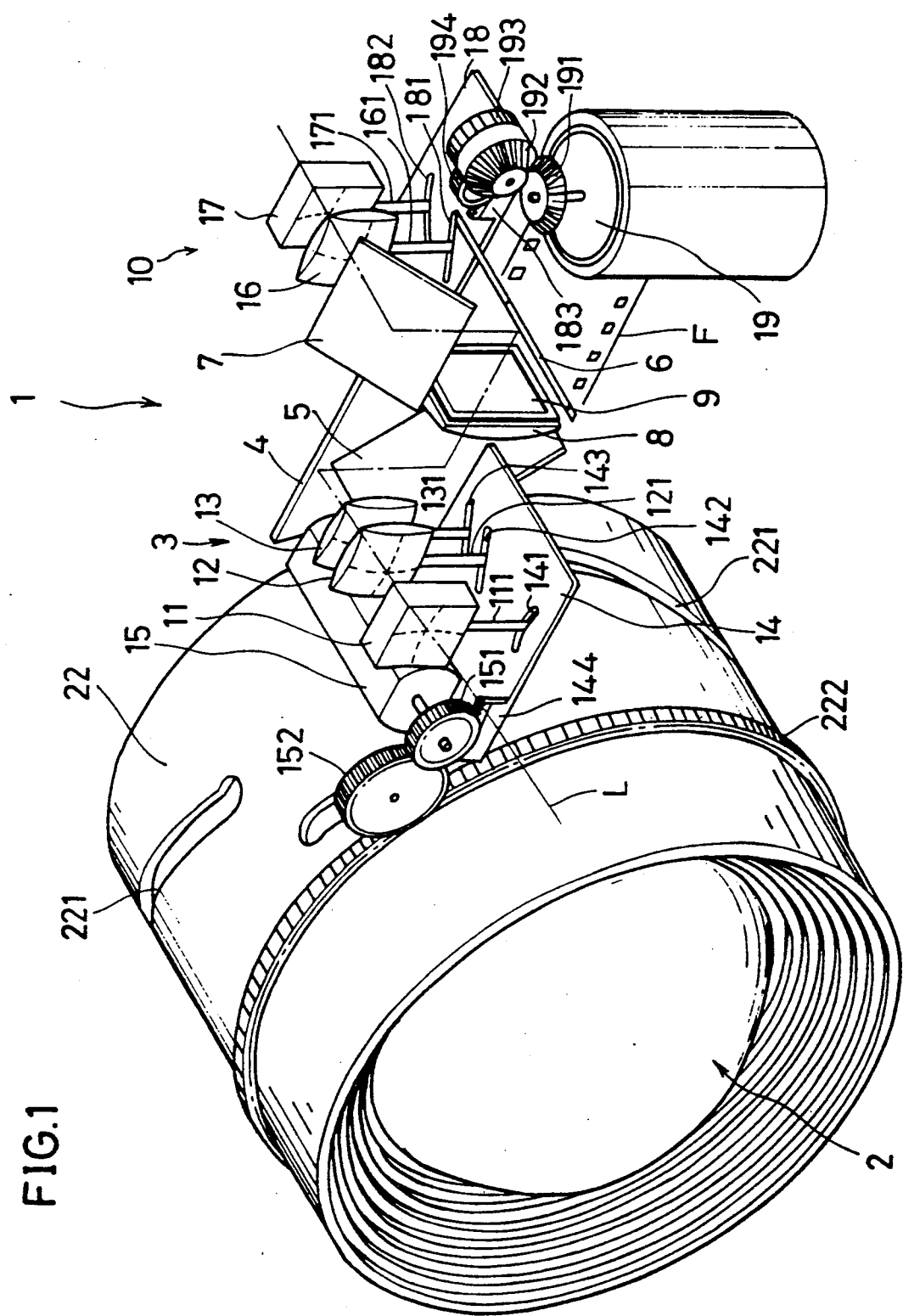
FIG. 1 is a perspective view of an optical system of a camera of an embodiment of the present invention.
Figure 2:
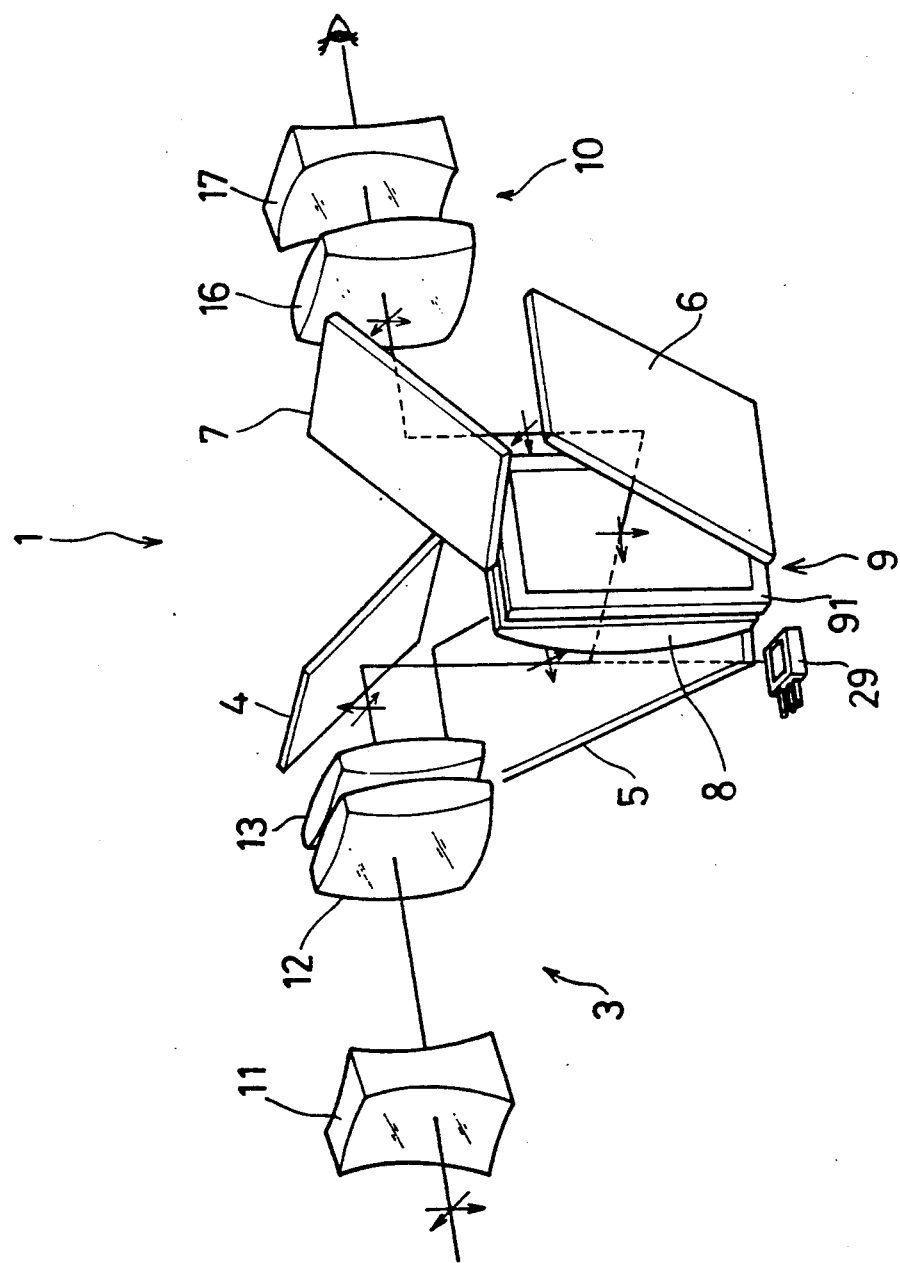
FIG. 2 is an exploded perspective view of a viewfinder of the optical system.
Figure 3:
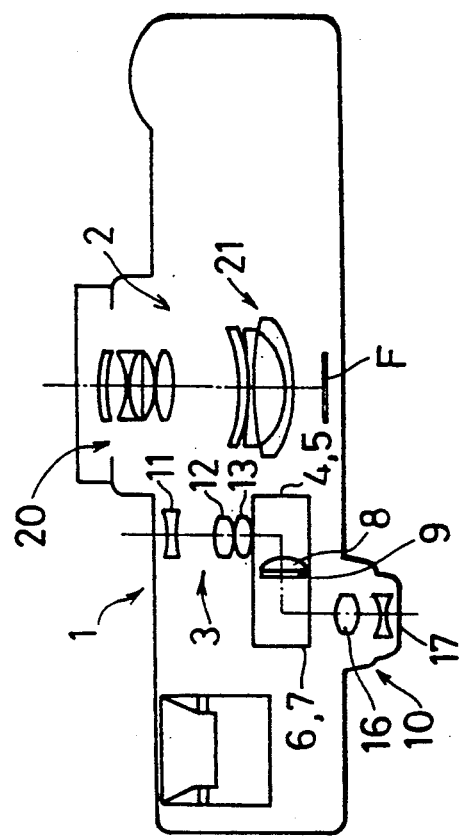
FIG. 3 is a schematic plan diagram showing a structure of the optical system of the camera.

Referring to FIGS. 1 to 3, an optical system of a camera includes a viewfinder 1 and a photographic lens 2. The viewfinder 1 includes an objective lens 3, a Porro mirror system of mirrors 4, 5, 6 and 7, a condenser lens 8, a finder field 9 and an eye-piece lens 10. The magnification of the viewfinder 1 is determined by a focal length of the objective lens 3 and that of the eye-piece lens 10.

The objective lens 3 includes a concave lens 11 and convex lenses 12 and 13. An inverted image is focused on the finder field unit 9 by the objective lens 3. The lenses 11, 12, and 13 are respectively supported by pins 111, 121, and 131. The pins 111, 121, and 131 are placed in cam slots 141, 142, and 143 formed in an actuator plate 14. A rack gear 144 is provided on an appropriate position of the actuator plate 14, for example, a front end portion of the actuator plate 14. The rack gear 144 is meshed with a wheel gear 152 fixedly attached on a drive shaft of a zoom motor 15.

Clockwise and counter clockwise rotations of the zoom motor 15 cause the actuator plate 14 to move in widthwise directions. Consequently, the pins 111, 121, and 131 are respectively moved in forward and backward directions by the cam slots 141, 142, and 143, so that the lenses 11, 12, and 13 move along an optical axis L. Accordingly, the focal length of the objective lens 3 is changed and the magnification of the objective lens 3 is then varied.

The Porro mirror system of mirrors 4, 5, 6 and 7 erect the inverted image produced by the objective lens 3 and then introduce it to the eye-piece lens 10. The mirror 5 of the Porro mirror system is made of a half mirror to introduce a part of the light ray from the subject to a photocell 29 to be described below. The condenser lens 8 is provided to make the entire field of view of the viewfinder 1 bright.

The finder field unit 9 includes a liquid crystal display device (LCD), an electrooptic device or the like. The finder field unit 9 is placed near the focal plane of the objective lens 3. The finder field unit 9 has a masking portion 91 of which the area is variable. The masking portion 91 is shown in the viewfinder 1 by rendering a part of the LCD opaque.

The eye-piece lens 10 includes a convex lens 16 and a concave lens 17. The lenses 16 and 17 are respectively supported by pins 161 and 171 which are placed in cam slots 181 and 182 formed in an actuator plate 18. Furthermore, a rack gear 183 is provided on an appropriate position of the actuator plate 18, for example, a front end portion of the actuator plate 18. The rack 183 is meshed with a wheel gear 194. The gear 194 is meshed with a wheel gear 193 which is formed integrally with a bevel gear 192. The bevel gear 192 is meshed with a bevel gear 191 which is fixedly attached to a rotary shaft of an eye-piece lens motor 19. The eye-piece lens motor 19 is rotated in a clockwise or counterclockwise direction in accordance with a control signal sent from a central control unit 36 to be described later.

The clockwise and counter clockwise rotations of the eye-piece lens motor 19 cause the actuator plate 18 to move in widthwise directions. The pins 161 and 171 are respectively moved in forward and backward directions by the cam slots 181 and 182, so that the lenses 16 and 17 move along the optical axis L. Consequently, the focal length of the eye-piece lens 10 is changed and the magnification of the eye-piece lens 10 is then varied.

As shown in FIG. 3, the photographic lens 2 is a zoom lens including a forward member 20 and a rearward member 21. An image of a subject being photographed is focused on another focal plane at which a frame of a loaded film is positioned by moving the forward member 20 and the rearward member 21 in relative to each other along the optical axis of the photographic lens 2 with focusing means (not shown in the drawings).

The photographic lens 2 has a pin (not shown) placed through a cam slot 221 formed in a zoom ring 22. The forward member 20 and the rearward member 21 of the photographic lens 2 are moved in accordance with rotation of the zoom ring 22. The zoom ring is provided with a gear 222 on an appropriate postion of the periphery thereof. The gear 222 is meshed with a gear 152 which is then meshed with the gear 151.

Accordingly, the actuator plate 14 and the zoom ring 22 are simultaneously moved by the rotation of the zoom motor 15, so that the magnification of the photographic lens 2 and that of the objective lens 3 of the viewfinder 1 are varied in a fixed relationship between them.

It should be noted that instead of the Porro mirror system of mirrors 4, 5, 6 and 7, a Porro prism, an Abbe prism, a combination of a reflecting mirror and a Pentadapha prism, or a Pecham prism may be used.

Figure 4:
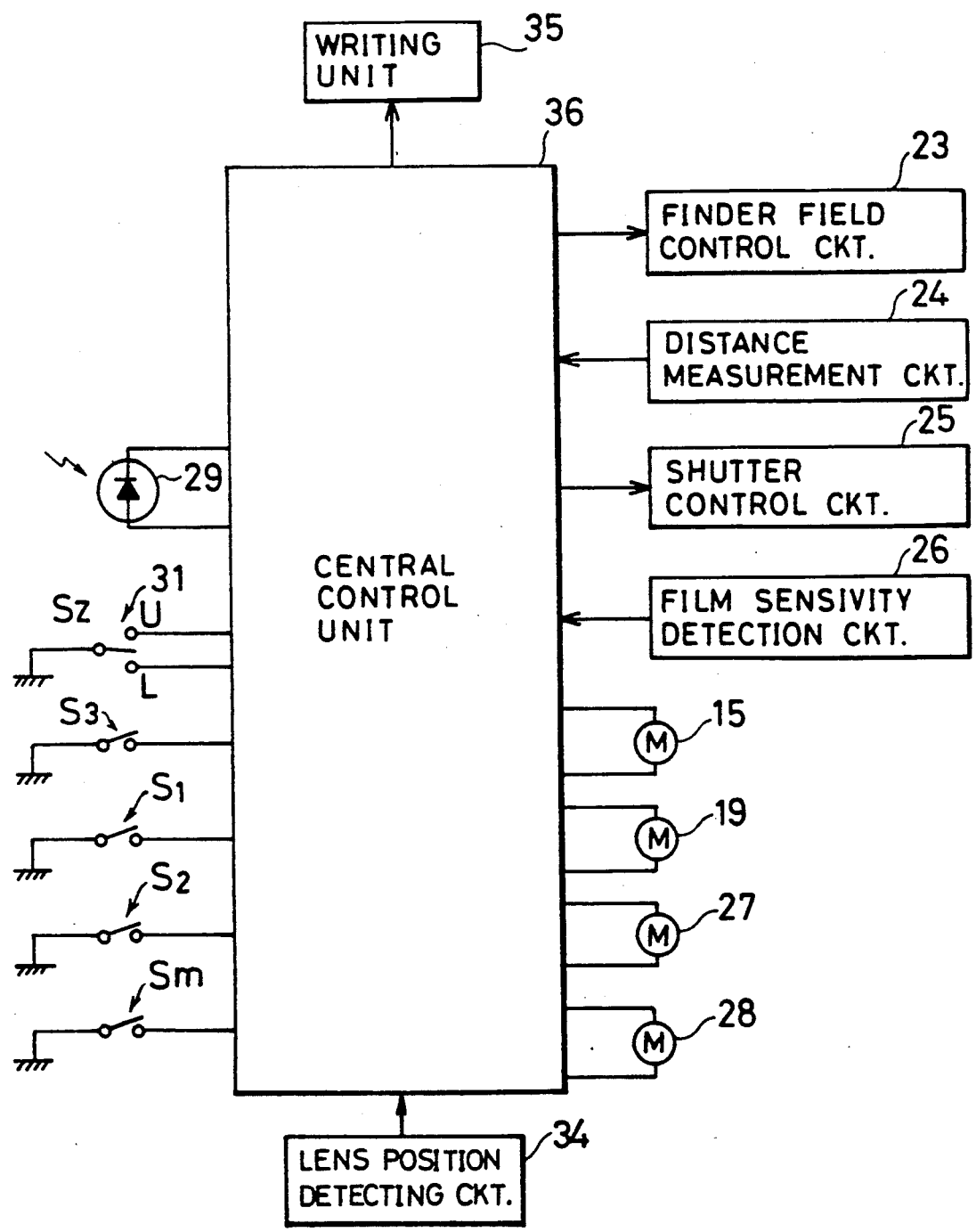
FIG. 4 is a diagram showing a control portion for controlling an objective lens and an eye-piece lens of the viewfinder.

Next, drive control of the objective lens 3 and the eye-piece lens 10 will be described with reference to FIG. 4.

The central control unit 36 is connected with a finder field control circuit 23, a distance measurement circuit 24, a shutter control circuit, a film sensitivity detection circuit 26, the zoom motor 15, the eye-piece lens motor 19, a film motor 27, a focusing motor 28, the photocell 29, a photography ready switch S1, a release switch S2, a mode selection switch S3, a zooming switch Sz, a main switch Sm, a writing unit 35, and a lens position detecting circuit 34.

The finder field control circuit 23 controls the area of the masking portion 91 in accordance with a signal sent from the central control unit 36. The distance measurement circuit 24 measures the distance to the subject and issues a distance signal. The shutter control circuit 25 controls a shutter for the photographic lens 2.

The film sensitivity detection circuit 26 reads film sensitivity data of the loaded film. For example, the sensitivity data is provided on an outer surface of the film container. The film motor 27 advances one frame of the film each photographing or winds up the film after finishing to photograph all the frames of the film. The focusing motor 28 drives the photographic lens 2 so as to come into the focus position.

The photocell 29 outputs an optical signal corresponding to the amount of light received through the mirror 5.

The mode selection switch S3 is adopted for changing over the zooming mode, i.e., changing from an actual zooming mode to a pseudo zooming mode and vice versa. When the mode selection switch S3 is turned on, the viewfinder 1 is set in the actual zooming mode.

The zooming switch Sz is adopted for starting and stopping the zooming of the viewfinder 1. When the zooming switch Sz is connected to an upper contact, the zooming is performed to the teleward limit. When the zooming switch Sz is connected to a lower contact, the zooming is performed to the wideward limit.

The photography ready switch S1 is adopted for starting light and distance measurements to detect the brightness of the subject and the distance to the subject. The release switch S2 is adopted for driving the shutter to expose the film. The photography ready switch S1 is turned on when a release button (not shown) is pressed halfway. The release switch S2 is turned on when the release button is pressed all the way. The main switch Sm is adopted for supplying the power source to the camera.

The writing unit 35 is adopted for writing photography data to the film. The photography data has the magnification of the viewfinder when photography is made in the pseudo zooming mode. Specifically, the photography data is electronically put in a memory provided in the film container by an appropriate writing device. Alternatively, an appropriate position of each frame of the film is exposed by codes representative of the photography data.

The lens position detecting circuit 34 detects that the objective lens 3 and the eye-piece lens 10 of the viewfinder 1, or the photographic lens 2 is positioned at the teleward limit or wideward limit, and generates different signals to the central control unit 36 according to the limit positions.

The central control unit 36 receives signals from the distance circuit 23, film sensitivity detection circuit 26, photocell 29, and switches S1, S2, S3, Sz, and Sm, then performing predetermined calculations, and controlling the finder field control circuit 23, the shutter control circuit 25 and the motors 15, 19, 27 and 28.

Figure 5:
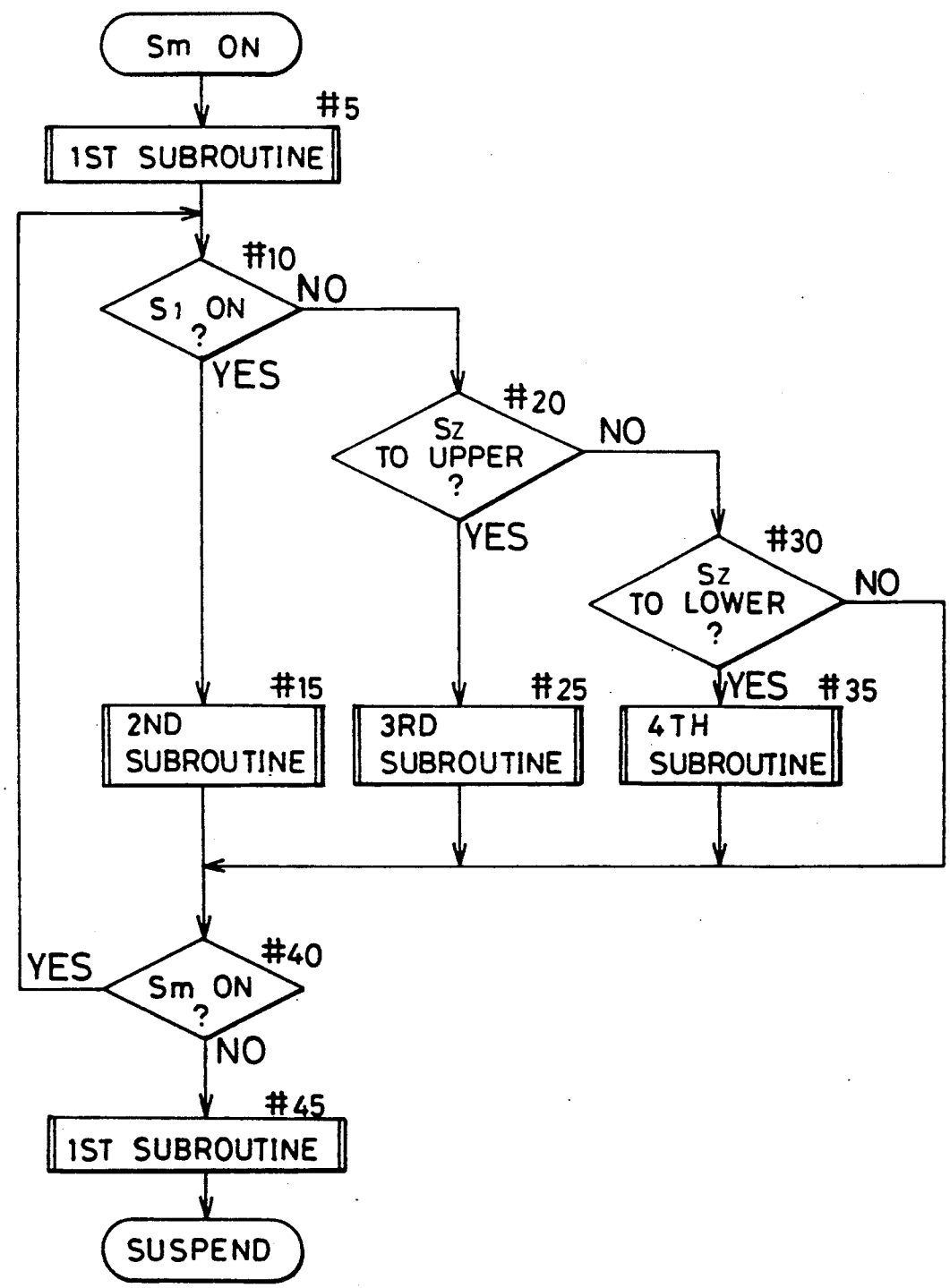
FIG. 5 is a flowchart showing a main routine of the control portion.

A first control of the camera will be described with reference to FIGS. 5 to 9. First, referring to FIG. 5 showing a main routine of the first control, this main routine is started when the main switch Sm is turned on. In Step #5, the optical system is reset in accordance with a first subroutine. This reset operation is carried out when a battery for the power source is replaced with a fresh battery or other operations.

Subsequently, it is discriminated whether one of the photography ready switch S1 and the zooming switch Sz is turned on in Steps #10, #20, and #30. Specifically, if the photography ready switch S1 is turned on, this main routine advances to Step #15 in which a second subroutine is executed, and then advances to Step #40 in which it is discriminated whether the main switch Sm is turned on.

If the photography ready switch S1 is not turned on, this main routine advances to Step #20 in which it is discriminated whether the zooming switch Sz is connected to the upper contact. If the zooming switch Sz is connected to the upper contact, this main routine advances to Step #25 in which a third subroutine is executed, and then advances to Step #40.

On the other hand, if the zooming switch Sz is connected to the lower contact, this main routine advances to Step #30 in which it is discriminated whether the zooming switch Sz is connected to the lower contact. If the zooming switch Sz is connected to the lower contact, this main routine advances to Step #35 in which a fourth subroutine is exected, and then advances to Step #40. If the zooming switch Sz is not connected to the lower contact, this main routine advances directly to Step #40.

In Step #40 in which it is discriminated whether the main switch Sm is turned on, if the main switch Sm is turned on, this main routine returns to Step #10 and operations of Steps #10 to #35 are repeated. On the other hand, if the main switch Sm is turned off, the main routine advances to Step #45 in which the first subroutine is exected, and then is suspended until the main switch Sm is turned on.

Figure 6:
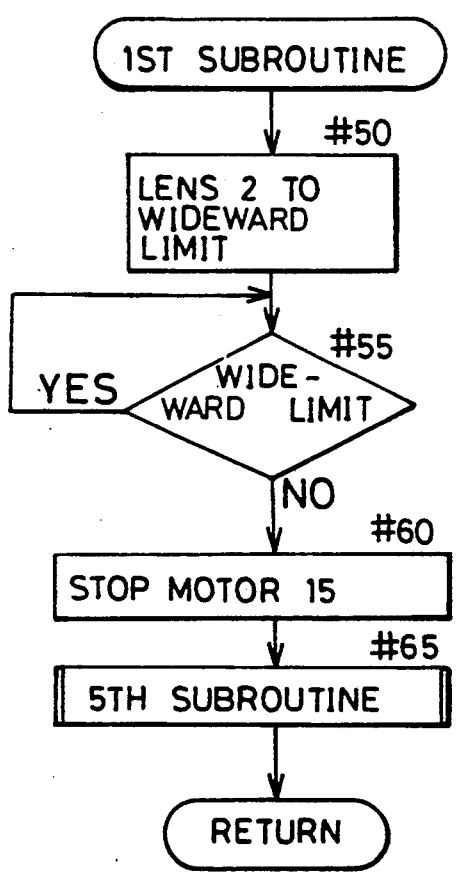
FIGS. 6 to 9 are flowcharts showing subroutines constituting a first control.

The first subroutine will be described with reference to FIG. 6. In this subroutine, the photographic lens 2 and the objective lens 3 of the viewfinder 1 are firstly reset. Specifically, in Steps #50 and #55, the photographic lens 2 and the objective lens 3 are driven to the wideward limit by the zoom motor 15. Detection as to whether the photographic lens 2 and the objective lens 3 reach the wideward limit is executed by an encoder device, limit switch device or the like. Alternatively, the detection may be executed by checking the electric current flowing in the zoom motor 15 to find a steep rise because of the fact that when the photographic lens 2 and the objective lens 3 reach the wideward limit, the zoom motor 15 is overloaded and the current to the zoom motor 15 then rises steeply.

When the photographic lens 2 and objective lens 3 reach the wideward limit, the zoom motor 15 is stopped in step #60, subsequently, this subroutine advances to step #65 in which a fifth subroutine is executed, and returns to the main routine.

Figure 7:
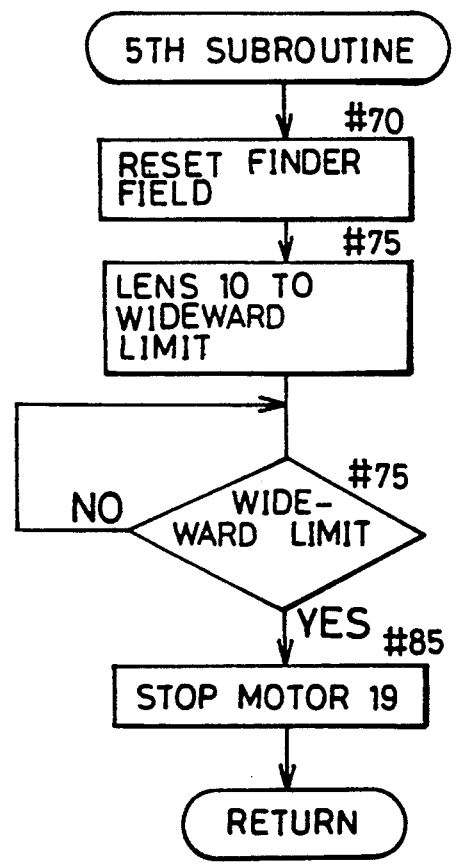

The fifth subroutine will be described with reference to FIG. 7. In Step #70, the masking portion 91 of the finder field 9 is put off. In Steps #75 and #80, subsequently, the eye-piece lens 10 is driven to the wideward limit by the eye-piece lens motor 19. when the eye-piece lens reaches the wideward limit, the eye-piece lens motor 19 is stopped. Thereafter, this subroutine returns to the first subroutine.

Figure 8:
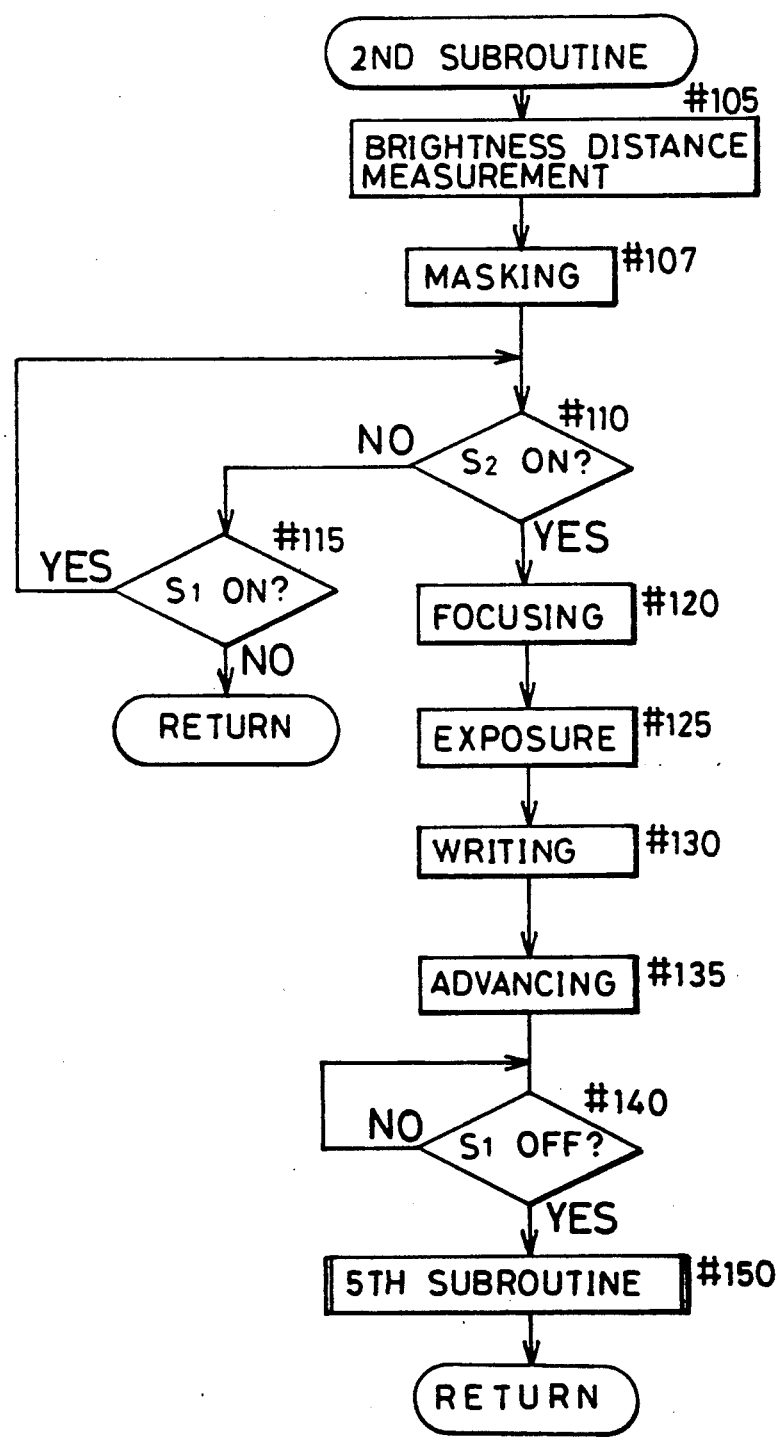

Next, the second subroutine will be described with reference to FIG. 8. In step #105, first, the brightness of the subject is obtained based on the optical signal from the photocell 29 and the distance to the subject is obtained by the distance measurement circuit 24. Subsequently, the masking portion 91 is put on in the finder field to show an area to be printed by the finder field control circuit 23 in Step #107. Thereafter, this subroutine advances to step #110 in which it is discriminated whether the release switch S2 is turned on.

If the release switch S2 is not turned on, this subroutine advances to Step #115 in which it is discriminated whether the photography ready switch S1 is turned on in Step #115. If the photography ready switch S1 is turned on, this subroutine returns to Step #110. In other words, the so-called AE lock or AF lock is performed by keeping pressing the release button halfway. If the photography ready switch S2 is not turned on, this subroutine returns to the main routine.

If the release switch S2 is turned on in Step #110, this subroutine advances to Step #120 in which the focusing of the photographic lens 2 is carried out in accordance with the obtained distance by the focusing motor 28. In step #125, the film is exposed in accordance with the obtained subject brightness and the film sensitivity signal from the film sensitivity detection circuit 26 by the shutter control circuit 25.

Subsequently, in Step #130, the pseudo zooming magnification for the instant exposed film frame is stored in the writing unit 35. The pseudo zooming magnification is the result of the division of the actual field of view by a pseudo field of view. The pseudo zooming magnification is calculated based on the focal length of the eye-piece lens 10 detected by an encoder device (not shown) or the like. In Step #135, the film is advanced one frame by the film motor 27. Thereafter, this subroutine advances to Step #140 in which it is discriminated whether the photography ready switch S1 is turned off. If the photography ready switch S1 is turned off, this subroutine advances to Step #150 in which the fifth subroutine of FIG. 7 is executed, and then returns to main routine. In the first control, continuous photographing is not practiced.

Figure 9:
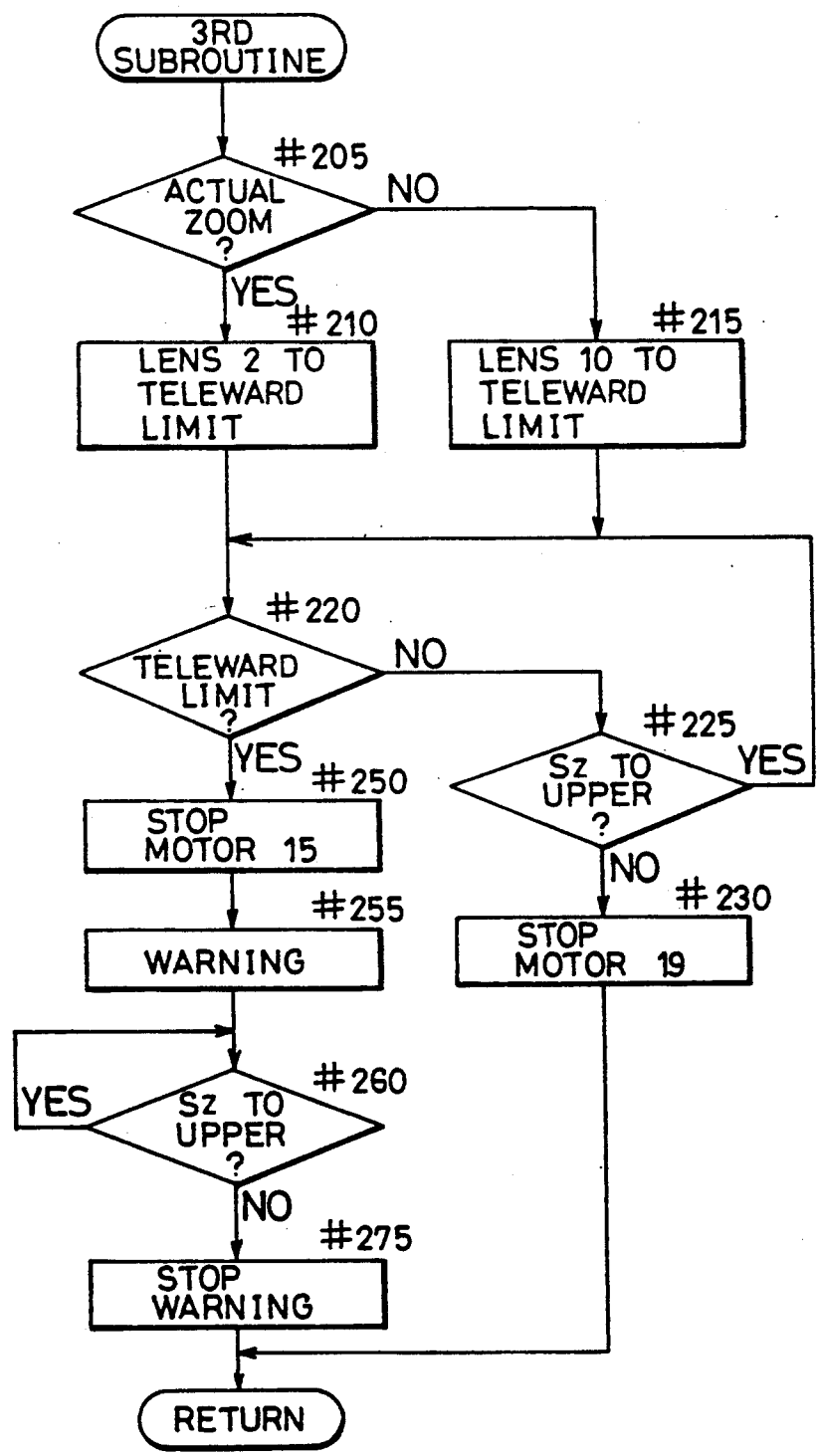

The third subroutine will be described with reference to FIG. 9. First, it is discriminated in Step #205 whether the actual zooming mode is selected. If the actual zooming mode is selected, this subroutine advances to Step #210 in which the photographic lens 2 and the objective lens 3 are driven to the teleward limit by the zoom motor 15, and then advances to Step #220.

On the other hand, if the actual zooming is not selected, that is, the pseudo zooming is selected, this subroutine advances to Step #215 in which the eye-piece lens 10 is driven to the teleward limit by the eye-piece lens motor 19, and then advances to Step #220.

In step #220, it is discriminated whether the photographic lens 2 and the objective lens 3, or the eye-piece lens 10 reaches the teleward limit. If not, this subroutine advances to Step #225 in which it is discriminated whether the zooming switch Sz is connected to the upper contact. If the zooming switch Sz is connected to the upper contact, this subroutine returns to Step #220. In other words, the driving of the photographic lens 2 and the objective lens 3, or the eye-piece lens 10 to the teleward limit is held until they reach the teleward limit or the zooming switch Sz is turned off. The detection as to whether the photographic lens 2 and the objective lens 3, or the eye-piece lens 10 reaches the teleward limit is executed by an encoder device, limit switch device or the like. Alternatively, the detection may be executed by checking the electric current flowing in the zoom motor 15 and the eye-piece lens motor 19 to find a steep rise because of the fact that when the photographic lens 2 and the objective lens 3, or the eye-piece lens 3 reaches the teleward limit, the zoom motor 15 and the eye-piece lens motor 19 are overloaded and the current to the zoom motor 15 and the eye-piece lens 19 then rises steeply.

If the zooming switch Sz is not connected to the upper contact in Step #225, the zoom motor 15 or the eye-piece lens motor 19 is stopped in Step #230. Thereafter, this subroutine returns to the main routine.

If the photographic lens 2 and the objective lens 3, or the eye-piece lens 10 reaches the teleward limit, the zoom motor 15 or the eye-piece lens motor 19 is stopped in Step #250 and warning is made that the zooming cannot be performed to the teleward limit more. Thereafter, this subroutine advances to Step #260 in which it is discriminated whether the zooming switch Sz is connected to the upper contact. If the zooming switch Sz is disconnected from the upper contact, this subroutine advances to Step #275 in which the warning is stopped, and then returns to the main routine. The warning is made by lighting a LED provided in the viewfinder, or generating a buzzing sound.

The fourth subroutine is the same as the third subroutine except for the fact that the photographic lens 2, the objective lens 3, and the eye-piece lens 19 are driven to the wideward limit, and the driving to the wideward limit is discriminated.

Next, there will be described views which are provided in the viewfinder 1 in the first control with reference to FIG. 10A to 10G. It should be noted that FIGS. 10A to 10G show views which are provided in the pseudo zooming mode with the photographic lens 2 being held at a fixed focal length. Views which are provided in the actual zooming mode are omitted because of the fact that in the actual zooming mode, the size of image in the finder field is merely varied.

Figure 10A:
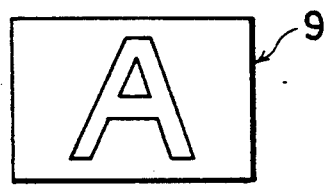
FIGS. 10A to 10G are diagrams showing views in the viewfinder provided in accordance with the first control.
Figure 10B:
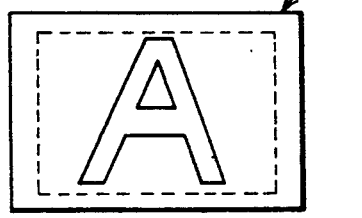
Figure 10E:
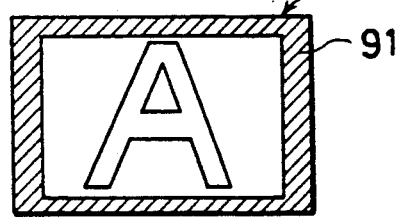
Figure 10C:
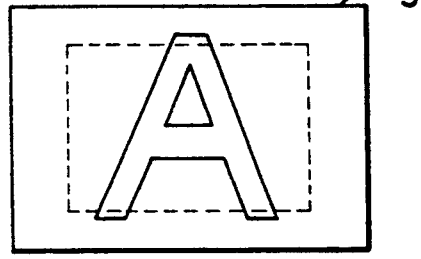
Figure 10F:
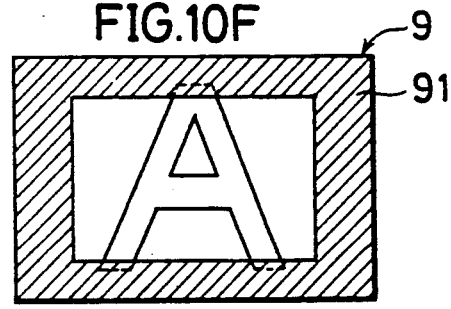
Figure 10D:
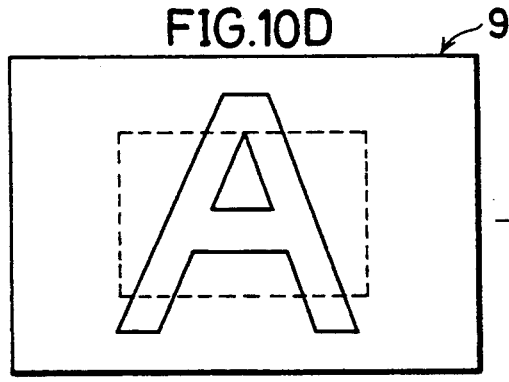

FIG. 10A shows a view in the viewfinder just after resetting for the pseudo zooming mode, that is, the fifth subroutine is executed. If the zooming switch Sz is connected to the upper contact after resetting, the eye-piece lens 10 is driven to the teleward limit by the eye-piece lens motor 19. Consequently, the finder field is enlarged as shown in FIGS. 10B, 10C, and 10D. FIGS. 10B, 10C, and 10D show views of pseudo magnifications of 1.2, 1.5, and 2.0, respectively.

Views are varied from FIG. 10A to FIG. 10D, or from FIG. 10D to FIG. 10A by changing the connection of the zooming switch Sz from the upper contact to the lower contact. It should be noted that the photographer can see only the view within an area defined by broken lines in each of FIGS. 10B to 10D. The area defined by the broken lines corresponds to the size of a viewing opening of the viewfinder 1.

Figure 10G:
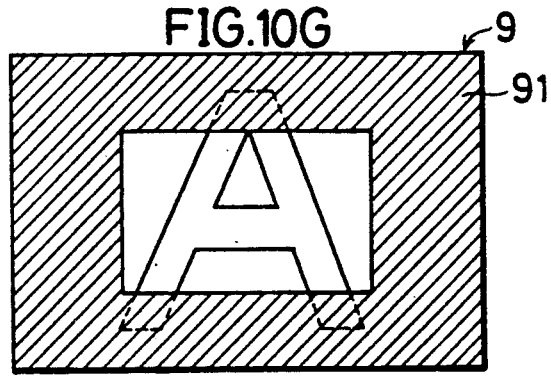

When the photography ready switch S1 is turned on after setting the eye-piece lens at a desired pseudo magnification, the second subroutine is executed. Consequently, the masking portion 91 is put on in the finder field to show an area to be printed as shown in FIGS. 10E TO 10G, that is, a limited pseudo telephoto print area. When the pseudo magnification is 1, the masking portion 91 is not put on because the area to be printed is identical with the entire area of the finder field.

In the first control, as described above, when the pseudo zooming mode is executed, the eye-piece lens 10 is driven to enlarge the finder field 9 and and the masking portion 91 is then put on to show the limited pseudo telephoto print area.

Next, a second control will be described with reference to FIGS. 11 to 14. In the second control, when the pseudo zooming mode is executed, the masking portion 91 is initially put on to show the limited pseudo telephoto print area, and the eye-piece lens 10 is thereafter driven to the teleward limit to enlarge the finder field. Also, it should be noted that the second control has the same main routine, first subroutine, second subroutine as the first control. Accordingly, it is omitted to describe the main routine, the first subroutine, and the second subroutine.

Figure 11:
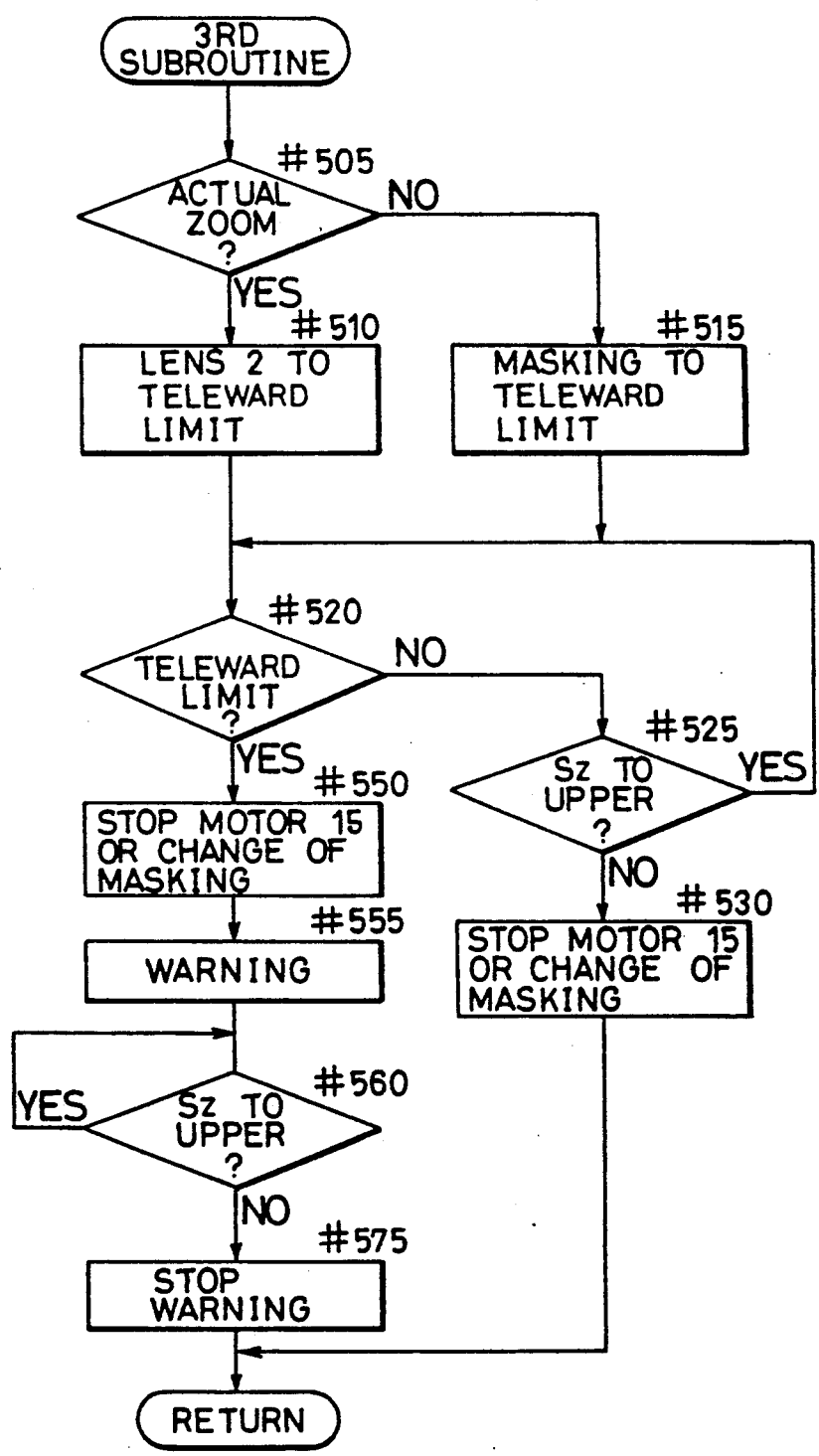
FIGS. 11 to 13 are flowcharts showing subroutines constituting a second control.
Figure 12:
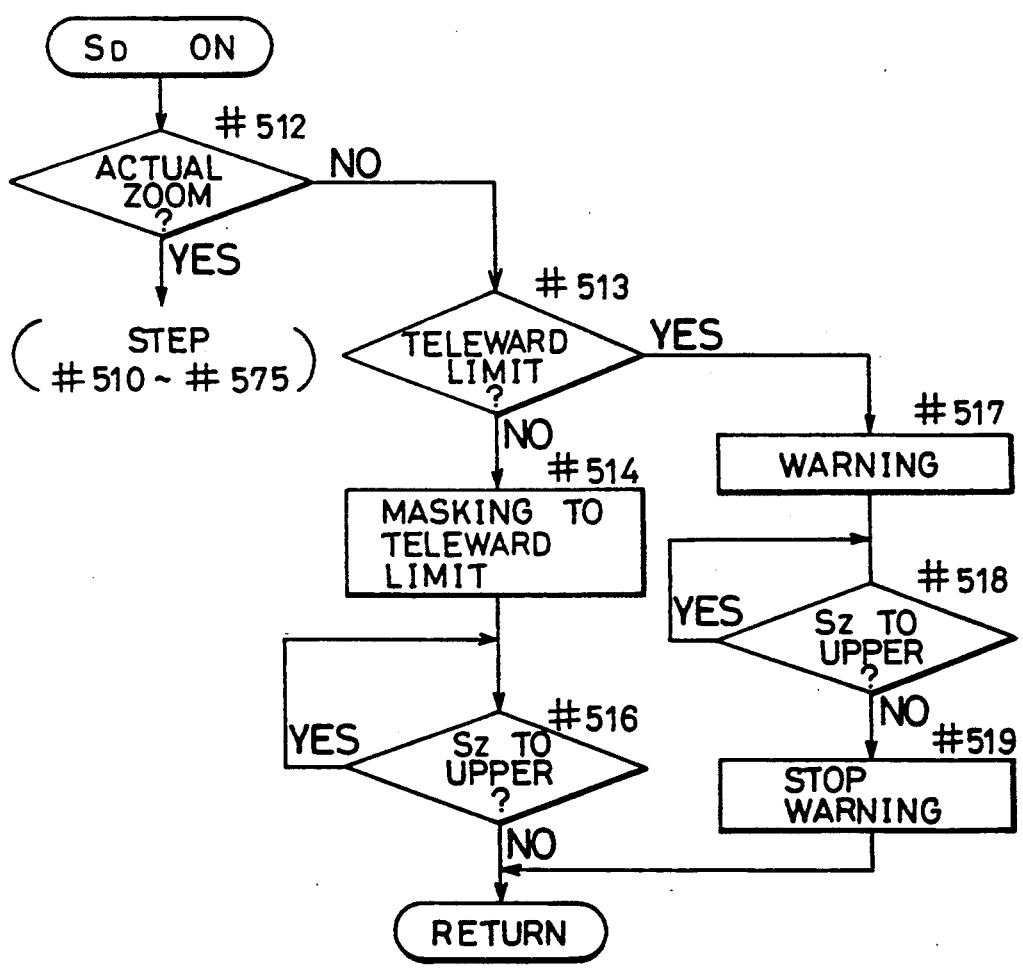

A third subroutine of the second control will be described with reference to FIG. 11. First, it is discriminated in Step #505 whether the actual zooming mode is selected. If the actual zooming mode is selected, this subroutine advances to Step #510 in which the photographic lens 2 and the objective lens 3 are driven to the teleward limit by the zoom motor 15, and then advances to Step #520.

On the other hand, if the actual zooming is not selected, that is, the pseudo zooming is selected, this subroutine advances to Step #515 in which the masking portion 91 is changed so as to correspond to the teleward limit by the finder field control circuit 23, and then advances to Step #520.

In Step #520, it is discriminated whether the photographic lens 2 and the objective lens 3, or the masking portion 91 is changed to the teleward limit. If not, this subroutine advances to Step #525 in which it is discriminated whether the zooming switch Sz is connected to the upper contact. If the zooming switch Sz is connected to the upper contact, this subroutine returns to Step #520. In other words, the driving of the photographic lens 2 and the objective lens 3, or changing of the masking portion 91 to the teleward limit is held until they reach the teleward limit or the zooming switch Sz is turned off.

If the zooming switch Sz is turned off in Step #525, the zoom motor 15 or the changing of the masking portion 91 is stopped in Step #530. Thereafter, this subroutine returns to the main routine.

If the photographic lens 2 and the objective lens 3, or the masking portion 91 reaches the teleward limit, the zoom motor 15 or the changing of the masking portion 91 is stopped in Step #550 and warning is made that the zooming cannot be performed to the teleward limit more. Thereafter, this subroutine advances to Step #560 in which it is discriminated whether the zooming switch Sz is connected to the upper contact. If the zooming switch Sz is disconnected from the upper contact, this subroutine advances to Step #575 in which the warning is stopped, and then returns to the main routine. The warning is made by lighting the LED in the viewfinder, or generating a buzzing sound.

A fourth subroutine of the second control is the same as the third subroutine except for the fact that the photographic lens 2, the objective lens 3 are driven to the wideward limit, or the changing of the masking portion 91 is practiced to the wideward limit, and the driving and changing to the wideward limit are discriminated.

In the above third and fourth subroutines, the pseudo magnification is continuously varied, that is, the limited pseudo telephoto print area is continuously changed. However, it will be seen that it is possible to change the pseudo magnification, for example, in four magnification stages of 1.0, 1.2, 1.5, and 2.0, consecutively, as a sixth subroutine shown in FIG. 12.

Specifically, it is discriminated in Step #512 whether the actual zooming mode is selected. If the actual zooming mode is not selected, this subroutine advances to step #513 in which it is discriminated whether the masking portion 91 is changed to the teleward limit. If the masking portion 92 is not changed to the teleward limit, this subroutine advances to Step #514 in which the masking portion 91 is changed to the teleward limit by the finder field control circuit 23, and then advances to Step #516. In step #516, it is discriminated whether the zooming switch Sz is connected to the upper contact. When the zooming switch Sz is disconnected from the upper contact, this subroutine returns to the main routine.

If the masking portion 91 is changed to the teleward limit, this subroutine advances to Step #517 in which warning is made that the zooming cannot be performed to the teleward limit more. Thereafter, this subroutine advances to Step #518 in which it is discriminated whether the zooming switch Sz is connected to the upper contact. If the zooming switch Sz is disconnected from the upper contact, this subroutine advances to Step #519 in which the warning is stopped, and then returns to the main routine.

If the actual zooming mode is selected in Step #512, the same operations as those of Steps #510 to #575 of the third subroutine are executed.

As mentioned above, in the sixth subroutine, the masking portion 91 is changed one stage by one stage by each turning on the zooming switch Sz. It should be noted that when the masking portion 91 is changed to the wideward limit, similar operations are executed.

Figure 13:
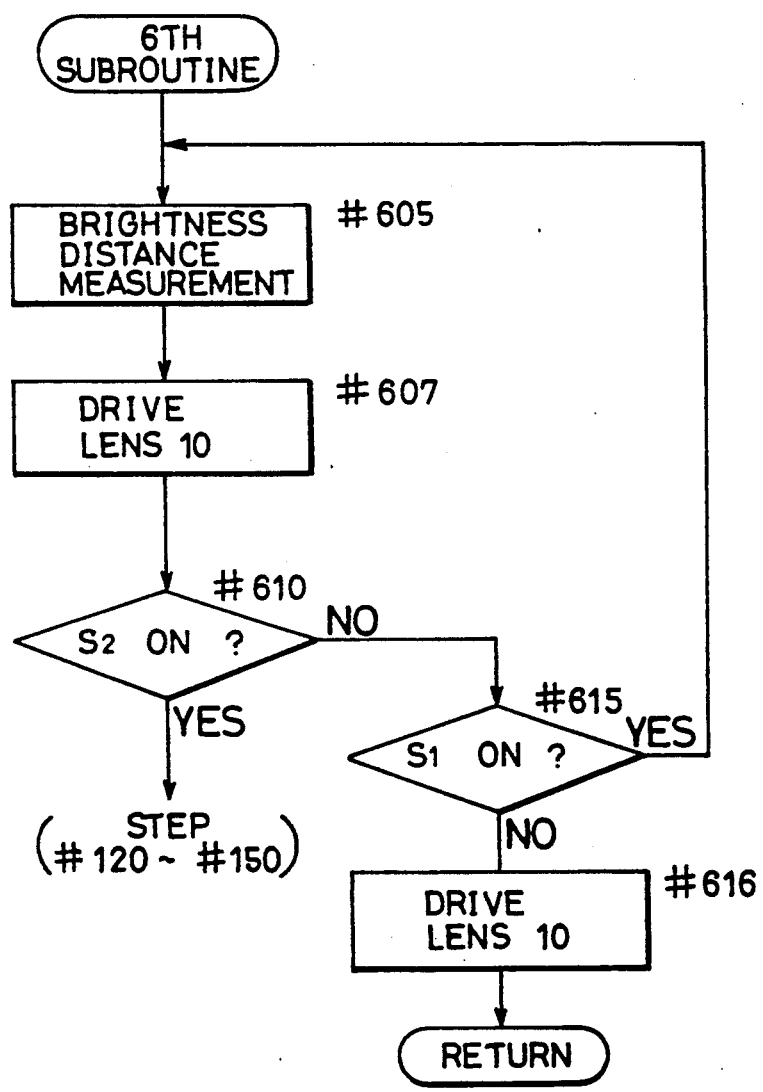

A second subroutine of the second control will be described with reference to FIG. 13. In step #605, first, the brightness of the subject is obtained based on the optical signal from the photocell 29 and the distance to the subject is obtained by the distance measurement circuit 24. In step #607, the eye-piece lens 10 is driven to the teleward limit to enlarge a view in the limited pseudo telephoto print area defined by the masking portion 91. Thereafter, this subroutine advances to Step #610 in which it is discriminated whether the release switch S2 is turned on.

If the release switch S2 is not turned on, this subroutine advances to Step #615 in which it is discriminated whether the photography ready switch S1 is turned on. If the photography ready switch S2 is turned on, this subroutine returns to Step #605. In other words, in the second control, the so-called AE lock and AF lock are not practiced during the time when the release button is pressed halfway. Accordingly, the exposure control and focusing are performed based on the latest light measurement and distance data.

If the photography ready switch S1 is turned off in Step #615, this subroutine advances to Step #616 in which the eye-piece lens 10 is reset in Step #616 to show the field of view of the photographic lens 2 in the viewfinder 1, and then returns to the main routine. If the release switch S2 is turned on in Step #610, the same operations are executed as those of Steps #120 to #150 in the flowchart of FIG. 8.

In the second control, the limited pseudo telephoto print area is first shown in the finder field by the masking portion 91. Accordingly, the photographer can confirm the limited pseudo telephoto print area beforehand, and thus can set the composition of a photograph precisely. The masking portion 91 is produced by LCDs or the like. Accordingly, the masking portion 91 can be changed in a short time and the composition can be set rapidly. Furthermore, when the photography ready switch S1 is turned on, the eye-piece lens 10 is drived so as to enlarge the limited pseudo telephoto print area to the size of the viewing opening. Accordingly, even if the actual magnification of the photographic lens is great and the limited pseudo telephoto print area is small, the pseudo zooming can provide the photographer with a clear pseudo view.

In the second control, it is discriminated whether the release switch S2 is turned off after the pseudo zooming is executed. However, it may be appropriate to provide an interruption subroutine which allows the operations of focusing, exposure, film to execute immediately after the release switch S2 is turned on even before or during the pseudo zooming. This interruption subroutine enables the photographer to execute the exposure at any time. Therfore, the photographing can be performed without losing a shutter chance.

Figure 14A:
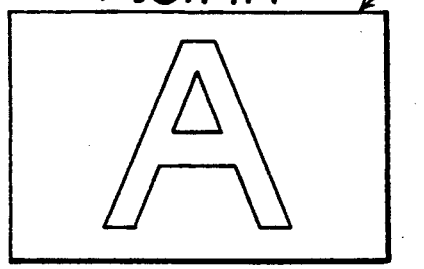
FIGS. 14A to 14G are diagrams showing views in viewfinder provided in accordance with the second control.
Figure 14B:
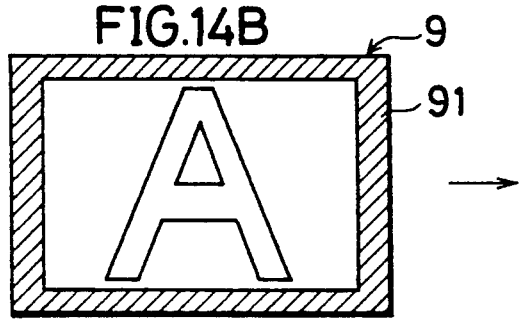
Figure 14E:
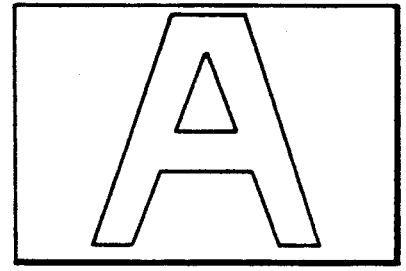
Figure 14C:
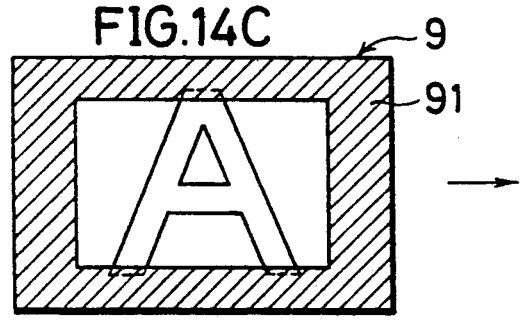
Figure 14F:
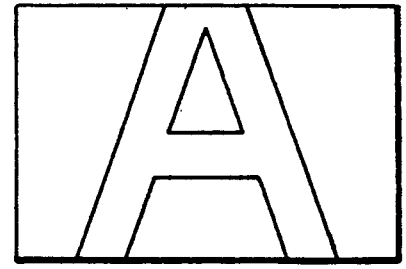
Figure 14D:
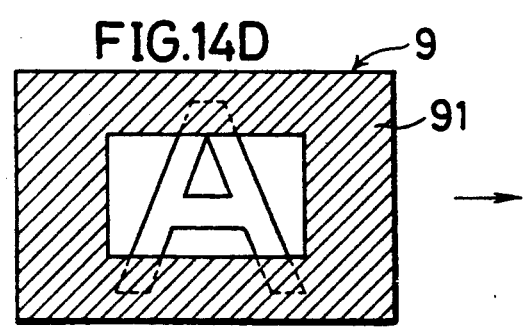

FIGS. 14A to 14G show views wihch are provided in the pseudo zooming mode with the photographic lens 2 being held at a fixed focal length. FIG. 14A shows a view in the viewfinder 1 just after resetting for the pseudo zooming mode, that is, the fifth subroutine is executed. If the zooming switch Sz is connected to the upper contact after resetting, the limited pseudo telephoto print area defined by the masking portion 91 is decreased as shown in FIGS. 14B, 14C, and 14D. FIGS. 14B, 14C, and 14D show views of pseudo magnifications of 1.2, 1.5, and 2.0, respectively.

Figure 14G:
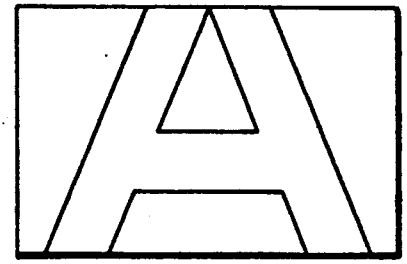

When the photography ready switch S1 is turned on after setting the eye-piece lens at a desired pesudo magnification, the eye-piece lens is driven to the teleward limit to enlarge the view within the limited pseudo telephoto print area to the size of the viewing opening as shown in FIGS. 14E, 14F, and 14G. The masking portion 91 is got out of the size of the viewing opening of the viewfinder 1. Accordingly, the masking portion 91 is not shown in FIGS. 14E, 14F, and 14G.

In the first and second controls, the fifth subroutine of resetting the pseudo zooming is executed each after exposing one film frame. However, it will be seen that the fifth subroutine is not required each after exposing one film frame. The omission of the fifth subroutine is preferably to continuously take photographs at nearly the same magnification.

Also, according to the present invention, the following modifications are appropriate. The operation of Step #140 in the flowchart of FIG. 8 may be omitted that the routine is held until the photographic ready switch S1 is turned off. Alternately, continuous photographing may be executed by keeping pressing the release button.

It may be appropriate to provide an autoprogram zooming mode that the zooming is automatically performed in accordance with the distance to an subject so as to have a fixed photographic magnification. In the autoprogram zooming mode, each time the distance to an subject changes, the zooming is required to be performed. It is necessary to perform the zooming immediately after the subject moves, or the camera moves. Accordingly, in the autoprogram zooming mode, the pseudo zooming is preferable to assure quick zooming.

In the autoprogram zooming mode, to respond to a rapid movement of the subject, it is preferably to change the limited pseudo print area only in accordance with the pseudo zooming without driving the eye-piece lens. In this case, it will be seen that when the pseudo magnification is great, it is difficult to see the view within the limited pseudo print area. However, since the photographic magnification is automatically determined, a significant problem will not occur. Also, the eye-piece lens motor may be put out of the control of the autoprogram zooming mode to enable the photographer to drive freely.

In the first and second controls, when the actual zooming or the pseudo zooming reaches the teleward limit or the wideward limit, the warning is generated and the zooming is stopped. Alternatively, it may be appropriate that when the actual zooming reaches the teleward limit or the wideward limit, the pseudo zooming is started, or when the pseudo zooming reaches the teleward limit or the wideward limit, the actual zooming is started.

More specifically, when the actual zooming reaches the teleward limit, the pseudo zooming is automatically started to the teleward limit of the pseudo zooming. Finally, when the pseudo zooming reaches the teleward limit, the warning is generated by the LED or the like to notify that the pseudo zooming cannot by performed to the teleward limit more, and the pseudo zooming is stopped. Conversely, when the pseudo zooming reaches the teleward limit, the actual zooming is automatically started to the teleward limit of the actual zooming. Finally, when the actual zooming reaches the teleward limit, another warning is generated to notify that the actual zooming cannot be performed more, and the actual zooming is stopped.

As mentioned above, the focal length of the objective corresponds to the actual zooming, the focal length of the eye-piece lens corresponds to the pseudo zooming. In other words, the objective lens and the eye-piece lens share the magnifications of the viewfinder. Accordingly, the respective focal lengths can be lowered. Consequently, the viewfinder can be manufactured easier.

Also, in the pseudo zooming, the eye-piece is driven. Accordingly, the magnification of the photographic lens is determined by the actual zooming and a limited pesudo telephoto print area is further determined by the pseudo zooming. Thereafter, the limited pseudo telephoto print area can be enlarged to the size of the viewing opening of the viewfinder to easily confirm the limited pseudo telephoto print area.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A camera comprising:
   a photographic lens system whose focal length is changeable;
   a viewfinder system including, an objective lens unit for forming, on a predetermined focal plane, an image of an object to be photographed, and an eye-piece lens unit for magnifying the image formed by said objective lens unit, the respective focal lengths of the objective lens unit and the eye-piece lens unit being changeable;
   a single operable member;
   first means, in accordance with the operation of said single operable manner, for changing the focal length of the photographic lens system and for changing the focal length of said objective lens unit of said viewfinder system;
   second means, in accordance with the operation of said single operable member, for changing the focal length of said eye-piece lens unit of said viewfinder system to attain a desired pseudo zooming magnification;
   means for storing the pseudo zooming magnification attained by said second changing means; and
   means for indicating, in a field displayed by said viewfinder system, an area to be reproduced, in accordance with the focal length of said eye-piece lens unit.

2. A camera as claimed in claim 1, wherein said single operable member is an up/down switch.

3. A camera as claimed in claim 1, further comprising means for selectively operating said first changing means and said second changing means.

4. A camera as claimed in claim 3, wherein said selectively operating means includes a manually operable member to be operated manually for selecting either of said first changing means and said second changing means.

5. A camera as claimed in claim 1, wherein said indicating means includes means for shielding an area not to be reproduced.

6. A camera as claimed in claim 5, wherein said shielding means includes a finder field unit provided in the viewfinder system, and located nearby said predetermined focal plane.

7. A camera as claimed in claim 6, wherein said finder field unit has a masking portion whose area is variable.

8. A camera as claimed in claim 1, further comprising first control means for controlling said second changing means and said indicating means so that said second changing means is operated prior to the operation of said indicating means.

9. A camera as claimed in claim 1, further comprising first control means for controlling said second changing means and said indicating means so that said indicating means is operated prior to the operation of said second changing means.

10. A camera comprising:
    a photographic lens system whose focal length is changeable;
    a viewfinder system including, an objective lens unit for forming, on a predetermined focal plane, an image of an object to be photographed, and an eye-piece lens unit for magnifying the image formed by said objective lens unit, the respective focal lengths of the objective lens unit and the eye-piece lens unit being changeable, said viewfinder system having an optical path different from that of said photographic lens system;

first means for changing the focal length of the photographic lens system;

second means for changing the focal length of said objective lens unit of said viewfinder system, in accordance with the change in the focal length of said photographic lens system;

third means for changing the focal length of said eye-piece lens unit of said viewfinder system to attain a desired pseudo zooming magnification;

means for storing the pseudo zooming magnification attained by said third means; and means for indicating, in a field displayed by said viewfinder system, an area to be reproduced, in accordance with the focal length of said eye-piece lens unit.

11. A camera as claimed in claim 10, wherein said first changing means includes an operable member for changing the focal length of said photographic lens system, and said third changing means includes means for changing the focal length of said eye-piece lens unit of said viewfinder system in accordance with the operation of said operable member.

12. A camera as claimed in claim 10, wherein said indicating means includes means for shielding an area not to be reproduced.

13. A camera as claimed in claim 12, wherein said shielding means includes a finder field unit provided in the viewfinder system and located nearby said predetermined focal plane.

14. A camera as claimed in claim 13, wherein said finder field unit has a masking portion whose area is variable.

15. A camera as claimed in claim 10, further comprising means for controlling said second changing means and said indicating means so that said second changing means is operated prior to the operation of said indicating means.

16. A camera as claimed in claim 10, further comprising means for controlling said second changing means and said indicating means so that said indicating means is operated prior to the operation of said second changing means.

17. A camera comprising:

a photographic lens system whose focal length is changeable;

a viewfinder system including, an objective lens unit for forming, on a predetermined focal plane, an image of an object to be photographed, and an eye-piece lens unit for magnifying the image formed by said objective lens unit, the respective focal lengths of the objective lens unit and the eye-piece lens unit being changeable;

a single operable member;

first means, in accordance with the operation of said single operable member, for changing the focal length of the photographic lens system and for changing the focal length of said objective lens unit of said viewfinder system;

second means, in accordance with the operation of said single operable member, for changing the focal length of said eye-piece lens unit of said viewfinder system to attain a desired pseudo zooming magnification; and means for storing the pseudo zooming magnification attained by said second changing means.

* * * * *